April 1, 1924.
C. G. PALMER
AUTOMOBILE SIGNAL
Filed Jan. 25, 1922
1,488,705
2 Sheets-Sheet 1
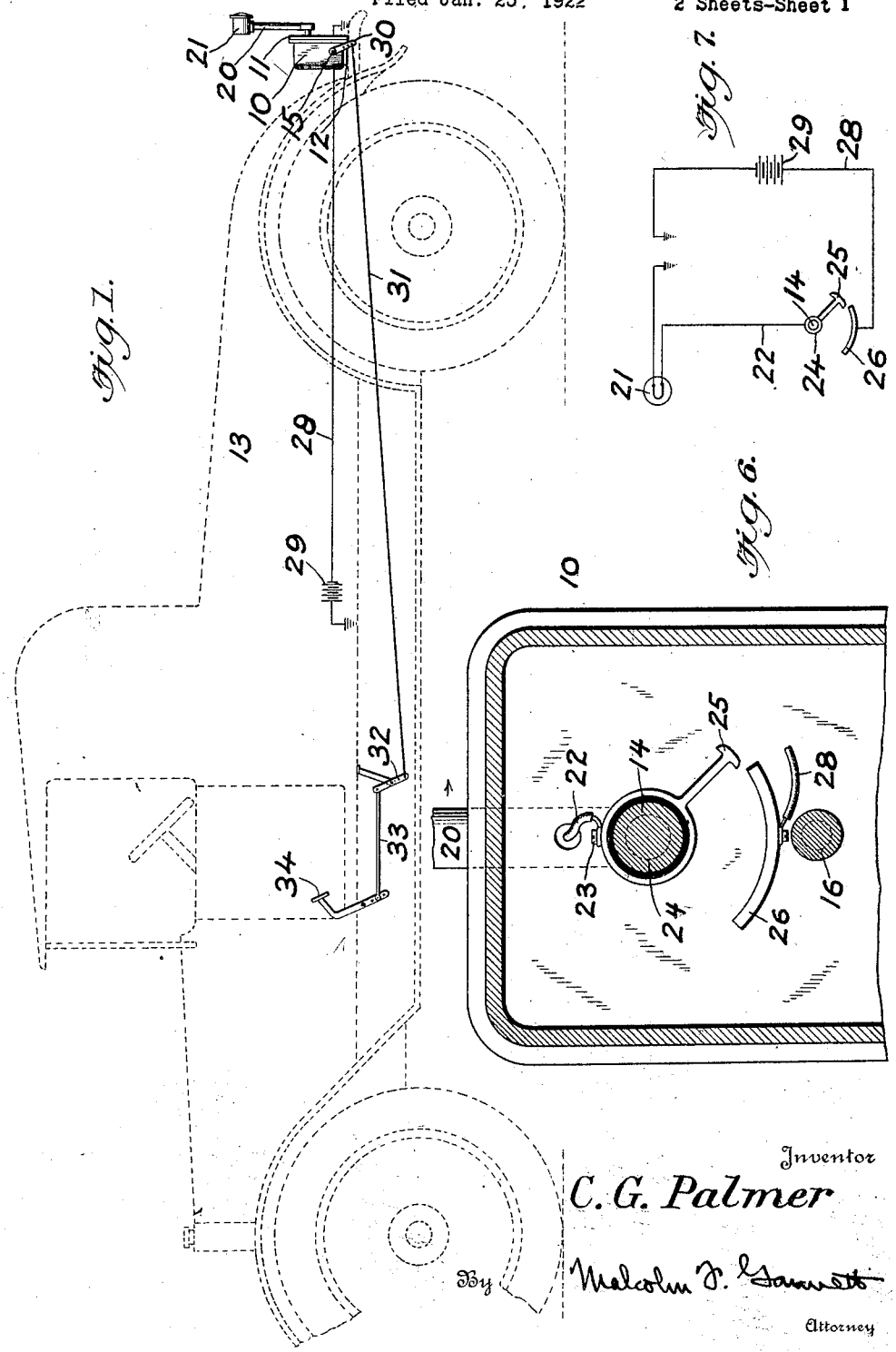

April 1, 1924. 1,488,705
C. G. PALMER
AUTOMOBILE SIGNAL
Filed Jan. 25, 1922 2 Sheets-Sheet 2
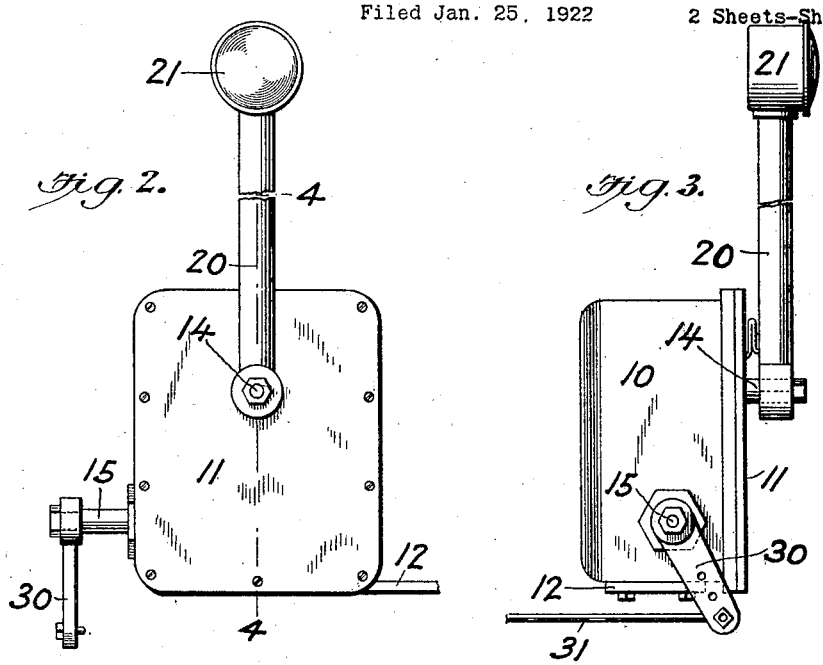
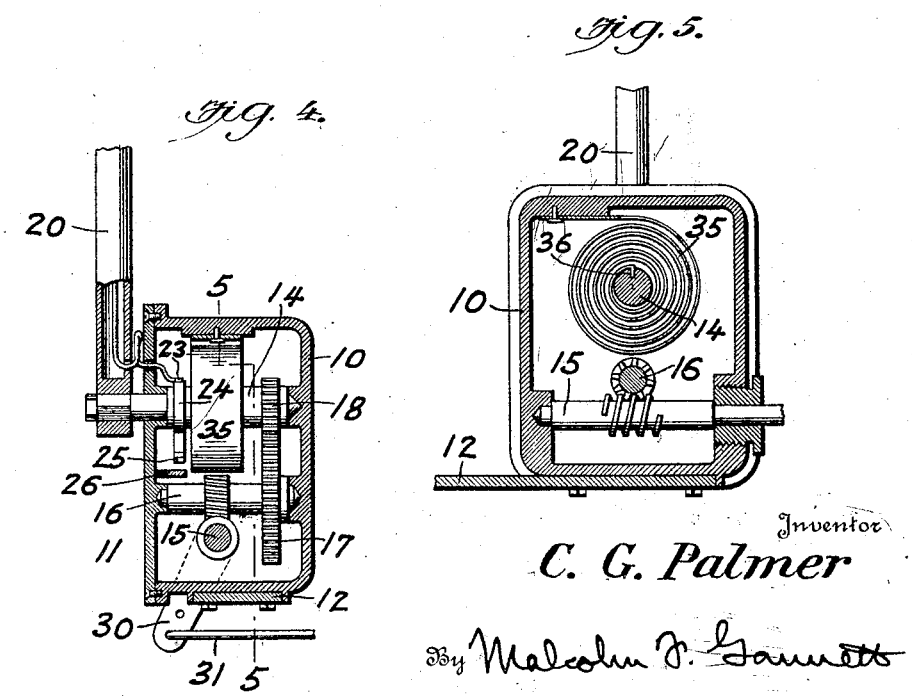
Inventor
C. G. Palmer
By Malcolm F. Gannett
Attorney Patented Apr. 1, 1924.

1,488,705

UNITED STATES PATENT OFFICE.

CLARENCE G. PALMER, OF CORNING, NEW YORK.

AUTOMOBILE SIGNAL.

Application filed January 25, 1922. Serial No. 531,657.

*To all whom it may concern:*

Be it known that I, CLARENCE G. PALMER, a citizen of the United States, residing at Corning, in the county of Steuben and State of New York, have invented new and useful Improvements in Automobile Signals, of which the following is a specification.

This invention relates to safety signals for vehicles, and the prime object is to provide a safety signal which will be automatically actuated by the driver of the vehicle to indicate the movements of the vehicle so that likelihood of accidents will be reduced.

Another object of my invention is to provide a safety signal for vehicles, the operation of which will be controlled through the mechanisms of the vehicle itself, whereby movements of the mechanisms of the vehicle will instantaneously impart motion to the signal without special attention of the driver to said signal.

This invention comprises a movable signal arm that is mounted on the rear of a vehicle, and means for actuating said arm. The signal arm is provided with an electric light, and there is an electric circuit containing a suitable circuit closer or switch which is controlled by the mechanism for operating the signal arm.

Referring to the accompanying drawings, wherein I have shown the preferred embodiment of my invention:—

Fig. 1, is a side elevation of an automotive vehicle showing the application of my invention thereto;

Fig. 2, is an enlarged elevation of my improved signal;

Fig. 3, is a side view of the parts shown by Fig. 2;

Fig. 4, is a vertical section taken on the line 4—4 of Fig. 2;

Fig. 5, is a similar view taken approximately on the line 5—5 of Fig. 4;

Fig. 6, is an enlarged detail view of the circuit closing mechanism, and

Fig. 7, is a diagrammatic view illustrating the electric circuit.

My invention comprises a casing 10 having integral sides and back and a detachable cover 11. The casing 10 is adapted to be fixed by means of a bracket 12, or other suitable means, to the rear portion of a vehicle, the cover of the casing facing away from the vehicle, as shown. As my invention is particularly designed to be used in connection with automotive vehicles, I have, for the purpose of illustration, shown the casing 10 attached, by means of the bracket 12, to the rear frame extension of an automobile 13. The relative position of the casing with respect to the automobile is such that the longitudinal axis of the casing approximately parallels the back of the vehicle.

Mounted in the casing 10 is a pair of shafts 14 and 15, the former lying near the top of the casing and extending transversely thereof and having one end projecting through the cover 11, and the latter lying near the bottom of the casing, longitudinally thereof, and having one end projecting through a side of the casing.

The shaft 15 is provided with a spiral gear that meshes with a similarly formed gear on another shaft 16. The shaft 16 is transversely mounted in the casing immediately above the shaft 15 and considerably below the shaft 14. The shafts 14 and 16 lie in the same plane (at right angle to shaft 15). The shaft 16 is provided with a relatively large gear 17, while the shaft 14 has a small gear 18, both of the gears 17 and 18 being located to one side of the center of the casing and meshing as shown.

When motion is imparted to the shaft 15, as will be hereinafter described, such motion is transmitted through the gearing to the shaft 14. The latter shaft will be turned considerably more than the former shaft, due to the difference in ratio of the gears 17 and 18.

To the outer end of shaft 14 is fastened a signal arm 20, which is provided at its upper extremity with a light element 21. The arm 20 is hollowed through a portion of its length for the purpose of receiving an electric conduit wire 22. One end of the wire 22 is fixed to a terminal 23, while the other end of the wire 22, is fixed to the light element 21. The light element, it is to be understood is grounded to the casing 10.

The terminal 23, to which the wire 22 is connected, forms one part of a circuit closer consisting of a sleeve 24 having an arm provided with a contact foot 25 that is adapted to engage with the other part of the circuit closer consisting of an arcuately formed plate 26 which is carried by the rear wall of the casing 10. The sleeve 24 is insulated from the shaft 14, as shown by Fig. 6, while the plate 26 is insulated from the casing 10, as shown by Fig. 4. The plate 26 is so positioned with respect to the other portions of the device that the foot 25 will ride thereon when the shaft 14 is turned to cause the arm 20 to tilt from an upright position, and the foot 25 will be disengaged from the plate 26 when the arm 20 is upright.

A wire 28 leading from a source of electric energy, such for instance as a storage battery 29 is secured to the plate 26. The storage battery is grounded as shown. To prevent draining of the battery when the engine of the automobile is idle, if so desired, the wire 28, can be connected to the automobile generator (not shown).

Keyed to the outer end of the shafts 15 is a downwardly extending arm 30 to which is fastened one end of a cable or rod 31, the opposite end of which is connected to a link 32 pivotally mounted on the frame of the vehicle. To the link 32 is connected a rod 33, that is fastened to the lower extremity of the clutch pedal 34 of the vehicle, which is also pivotally mounted in the vehicle.

The connection between the clutch pedal and the arm 30 on the outer end of shaft 15 is such that when the clutch pedal is depressed to break the connection between the engine and the driving gear of the vehicle, the rod 33 will be moved rearwardly. This motion will swing the link 32 on its pivot, and this will cause a pulling action to be exerted on the cable 31 which pulling action will swing the arm 30 forwardly.

In the operation of the device, and assuming that the parts are inoperative and the arm 20 is upright, when the driver of the vehicle depresses the clutch pedal 34, the arm 30 will be pulled forwardly as previously described. The shaft 15 will turn and in doing so will also turn the shaft 16. This motion will be imparted to the shaft 14 through the gears 17 and 18 and the shaft 14 will be turned in a direction opposite to that of the shaft 16. As the signal arm 20 is carried on the outer end of the shaft 14, this arm will be tilted from an upright position.

As the shaft 14 commences to turn, the contact foot 25 will ride onto the plate 26 thereby closing the electric circuit and illuminating the light element 21. As the plate 26 is formed concentric to the path partaken of by the foot 25, the circuit will remain closed until the arm 20 returns to a substantially upright position, as will be readily understood.

When the driver of the vehicle removes his foot from the clutch pedal 34, the parts will return to normal position.

For the purpose of absorbing all vibrations that may be caused by the vehicle travelling over rough roads, and also for the purpose of retaining the arm 20 upright when the parts are inoperative, use is made of a spiral spring 35, which is carried within the casing and which surrounds the shaft 14. One end of the spring 35 is fixed to the wall of the casing, as shown, while the other end of the spring is inserted in a slot 36, formed in the shaft 14.

When the parts are being assembled in the casing, the spring 35, if so desired, can be coiled loosely. While the casing is being secured to the frame of the vehicle, the arm 20 can be removed. Assuming that the cable 31 has not been connected to the arm 30 on the outer end of shaft 15, the arm 30 is revolved several times and the spring 35 is wound in a manner similar to that accomplished when winding the main-spring of a clock. When the spring 35 has been wound until it is coiled fairly tight, the arm 20 is fixed in an upright position to the outer end of shaft 14, and the end of the cable or rod 31 is secured to the arm 30.

As the arm 20 is being tilted from upright position, the rotation of the shaft 14 will cause a further tightening of the spring 35, as will be readily understood, and this tightening of the spring is such that as soon as the clutch pedal is released, the spring will expand and assist in returning the parts to normal position.

The arm 30 is shown as provided with a plurality of perforations, and the end of the cable or rod 31 can be fixed to either of these perforations when the parts are being assembled.

It is to be understood, that while I have described my device in connection with the clutch pedal, that if so desired it can be used in connection with the brake pedal or other operating mechanisms, of an automobile.

Having thus described my invention, what I claim is:—

1. A signal comprising a casing mounted on the rear frame of a vehicle, a shaft extending transversely of the casing near the top thereof and having one of its ends projecting beyond the casing and carrying a signal arm, a second shaft extending longitudinally of the casing near the bottom thereof and having one of its ends projecting beyond the casing and provided with an arm that is connected to a control pedal of the vehicle and adapted to be actuated thereby, a third shaft mounted in the casing between the first and second shafts and connected thereto by gearing, said third shaft being disposed in alignment with said first shaft whereby on movement being imparted to the second shaft the third shaft will oscillate the first shaft thereby tilting the signal arm carried thereby, and means carried by the first shaft for returning the said signal arm to normal position upon pressure being released from said control pedal.

2. A signal of the class described comprising a casing carrying a shaft near the top thereof, said shaft having a signal arm mounted thereon, another shaft mounted in the casing near the bottom thereof and disposed at right angles to said first named shaft and adapted to be actuated by a control pedal of the vehicle, means interposed between the two shafts for swinging the said signal arm when said control pedal is moved, and a spring coiled around the first named shaft and connected to the casing for the purpose specified.

In testimony whereof, I, hereunto, sign my name this 20th day of January 1922.

CLARENCE G. PALMER.